(12) United States Patent
Guzman-Casillas et al.

(10) Patent No.: US 6,356,421 B1
(45) Date of Patent: Mar. 12, 2002

(54) SYSTEM FOR POWER TRANSFORMER DIFFERENTIAL PROTECTION

(75) Inventors: Armando Guzman-Casillas, Pullman, WA (US); Hector Altuve-Ferrer, Nuevo Leon (MX); Stanley E. Zocholl, Holland, PA (US); Gabriel Benmouyal, Boucherville (CA)

(73) Assignee: Schweitzer Engineering Labs., Inc., Pullman, WA (US)

( * ) Notice: Subject to any disclaimer, the term of this patent is extended or adjusted under 35 U.S.C. 154(b) by 0 days.

(21) Appl. No.: 09/450,808

(22) Filed: Nov. 29, 1999

(51) Int. Cl.[7] ................................. H02H 7/04
(52) U.S. Cl. ........................ 361/36; 361/93.1
(58) Field of Search ........................ 361/36, 63, 93, 361/115, 35

(56) References Cited

U.S. PATENT DOCUMENTS

| | | | | |
|---|---|---|---|---|
| 4,204,237 A | * | 5/1980 | Zocholl | 361/36 |
| 4,402,028 A | * | 8/1983 | Udren | 361/36 |
| 4,616,174 A | * | 10/1986 | Jorgensen | 324/177 R |
| 5,095,399 A | * | 3/1992 | Terada et al. | 361/44 |
| 5,790,357 A | * | 8/1998 | Schiel | 361/36 |

* cited by examiner

Primary Examiner—Brian Sircus
Assistant Examiner—J. F. Duverne

(57) ABSTRACT

Current transformer (CT) secondary currents for the windings of a power transformer are used to produce a differential current. An operating current value is obtained from the differential current value. A restraining current value is obtained from processed winding current values. Second and fourth harmonic values of the differential current are obtained and are summed with a restraining current quantity which is a result of the restraining current multiplied by a slope characteristic factor. If the operating current value is greater than the sum of the restraining current quantity and the second and fourth harmonic values, an output signal is produced which may be used as a trip signal unless it is blocked by selected blocking signals generated by another portion of the system.

16 Claims, 4 Drawing Sheets

SYSTEM FOR POWER TRANSFORMER DIFFERENTIAL PROTECTION

TECHNICAL FIELD

This invention relates generally to transformer internal fault protection for electric power transformers, and more specifically concerns differential protection for such a transformer which includes harmonic restraint and blocking capability.

BACKGROUND OF THE INVENTION

It is important to first recognize and then take corrective action in response to the occurrence of internal faults in a power transformer. Prompt disconnection of the faulty transformer from the power system is necessary to avoid possible extensive damage to the transformer as well as to preserve power system stability and power quality.

Several different techniques have been developed to detect internal transformer faults, which initially included phase overcurrent protection, differential protection using differential currents, and gas accumulator/rate of pressure rise protective techniques for arcing faults. Differential protection is currently widely used as protection against relay internal faults. In differential protection, operating current ($I_{OP}$) (which may also be referred to as differential current), is compared with a restraining current ($I_{RT}$) The operating current is defined as the phasor sum of currents entering the protected element (the transformer) as shown in the following equation and in FIG. 1.

$$I_{OP} = |\vec{I_{W1}} + \vec{I_{W2}}|$$

In FIG. 1, the power transformer 10 is protected by differential relay 11. CT1 and CT2 are current transformers. The operating current is proportional to the fault current for transformer internal faults and approaches zero for non-faulted conditions. There are several equations for restraining current, including the following equation:

$$I_{RT} = k|\vec{I_{W1}} + \vec{I_{W2}}|$$

where k is a compensation factor, usually 1 or 0.5. A trip signal is generated if the operating current is greater than a selected percentage of the restraining current.

Conventional differential protection arrangements may misoperate, however, in the presence of what are known as transformer inrush currents, which are the result of transients in the magnetic flux within the transformer.

It has been recognized that the harmonic content of the differential current provides information which can help to differentiate actual internal faults from an inrush condition. Restraining techniques have been used which utilize all the harmonics of the differential current to distinguish inrush currents from internal fault conditions, so as to restrain a tripping action which would otherwise occur when there is in fact no internal fault.

As indicated above, known differential restraining protection typically uses all of the harmonics, or a combination of selected odd and even harmonics, of the differential current. A blocking arrangement, which results in blocking of the trip signal, has also been used. In one blocking arrangement, a second harmonic of the differential current is used. Existing transformer differential relays thus use either all-harmonic restraining or blocking techniques to distinguish between internal faults and inrush conditions. In addition, a fifth harmonic restraining technique has been used to prevent misoperation in response to transformer over-excitation, as opposed to internal faults.

These restraining and/or blocking techniques have resulted in increased security relative to inrush and transformer over-excitation, but can result in a delay of tripping action for actual internal faults under certain conditions.

Other techniques, such as recognition of wave shape distortion and recognition of the time interval during which the differential current is near zero, have been used. Still other techniques include recognition of DC offset or asymmetry in the differential current and the comparison of the amplitudes of positive and negative thresholds of differential current, with the selected thresholds being in two different polarized elements. These techniques are often used as enhancements to the basic restraining and/or blocking functions described above. However, no combination of these techniques have been found which provide an adequate solution, i.e. security for several specific inrush conditions.

Hence, there remains an opportunity for significant improvement in distinguishing internal faults from inrush and over-excitation conditions for particular power system operating conditions.

DISCLOSURE OF THE INVENTION

Accordingly, the present invention is for power transformer differential protection and comprises: means for developing a differential current value from processed current values which are representative of transformer (CT) secondary current values obtained from the windings of a power transformer; means for developing an operating current value from said differential current value; means for developing a restraining current value from said processed current values; means for obtaining even harmonic values of said differential current value; and means for comparing the sum of the restraining current values and the even harmonic values with the operating current value and for producing an output signal which in turn is useful in producing a trip signal when the operating current value is larger than said sum.

BEST MODE FOR CARRYING OUT THE INVENTION

The system of the present invention, which typically will be implemented as part of a protective relay for a power transformer, includes preferably three differential element arrangements. Each of the three differential elements/arrangements operates substantially identically, and can generally be considered as associated, respectively, as operating with the electric currents of a single phase (A, B or C)

or a selected combination of phase currents, e.g. AB, BC and CA, for the three-phase power transformer. Accordingly, the following explanation is directed generally, except for a first portion which produces input values for all three differential elements, toward the structure and operation of one differential element arrangement. The other two differential element arrangements are substantially identical, both in structure and function, to the one element.

Overall, the differential element arrangement of the present invention provides differential protection by means of an even harmonic restraining function and fifth harmonic and DC blocking functions. In addition, even harmonic blocking may be selected by the user as an alternative to even harmonic restraint.

In applicants' invention, the even harmonic restraining function may be used alone as a novel and unobvious alternative to existing differential protection systems, while fifth harmonic and DC blocking functions may be used individually with the even harmonic restraint function or used in combination with the even harmonic restraint function.

Figure 2:
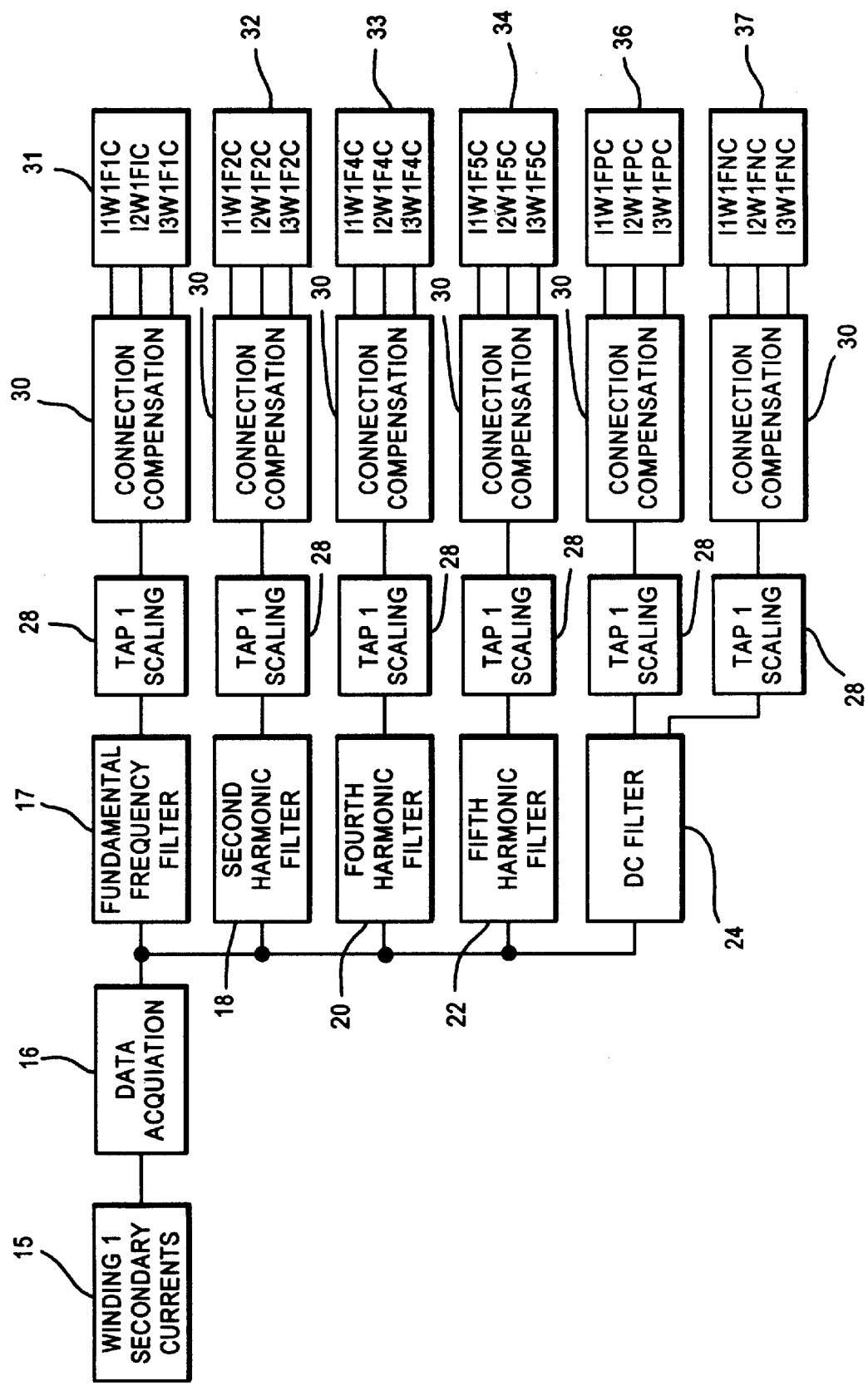
FIG. 2 is a block diagram showing an initial current processing portion of the system of the present invention.

FIG. 2 shows a block diagram for the initial acquisition of the electrical current values from winding one of the power system transformer being protected, as well as the subsequent filtering, scaling and compensation thereof. Similar circuits are provided for the other windings.

The input currents to the system of FIG. 2 are the transformer secondary currents from winding 1 of the power transformer operating off the power line. These currents are shown generally at block 15 in FIG. 2. These input currents are then applied to a system of analog low pass filters and analog-to-digital converters to produce filtered, digitized current samples. This arrangement is conventional and well-known and is represented in FIG. 2 by a data acquisition block 16. The digitized current samples from data acquisition system 16 is applied to four digital band pass filters 17, 18, 20 and 22 and also to a DC filter 24. The outputs of these filters are then processed by identical conventional scaling circuits 28-28, with selected scale values, referred to as "tap" values, the outputs of which are passed to connection compensation circuits 30-30 to provide the output currents for winding 1 of the transformer.

The output currents represented in blocks 31 through 34, are for the three differential elements and are referred to, respectively, as I1, I2, I3, from winding 1 of the transformer, including specifically the compensated fundamental, second harmonic, fourth harmonic and fifth harmonic values of the differential current, while the output currents represented in blocks 36 and 37 are the results of the DC filter 24 which receives the current samples from data acquisition block 16 and then forms one cycle sums of the positive (P) and negative (N) values of the samples. The output currents shown in blocks 31-27 are also referred to as processed winding currents.

As indicated above, FIG. 2 shows the acquisition and initial processing of the secondary currents from winding 1 of the transformer being protected, for all three differential element arrangements. The following explanation, however, concerns the structure and operation of only one differential element arrangement.

Figure 1:
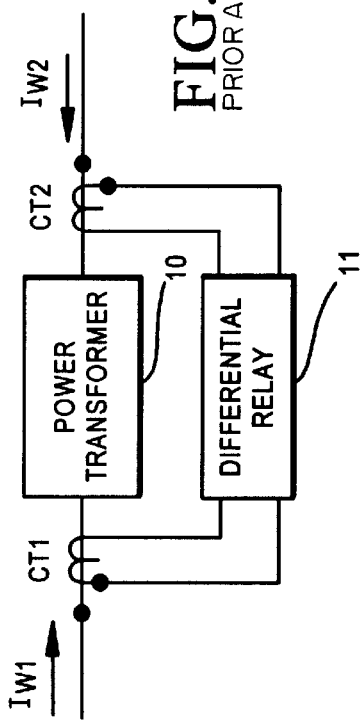
FIG. 1 is a simplified prior art diagram illustrating the differential current for a protected element, such as a power system transformer.
Figure 3:
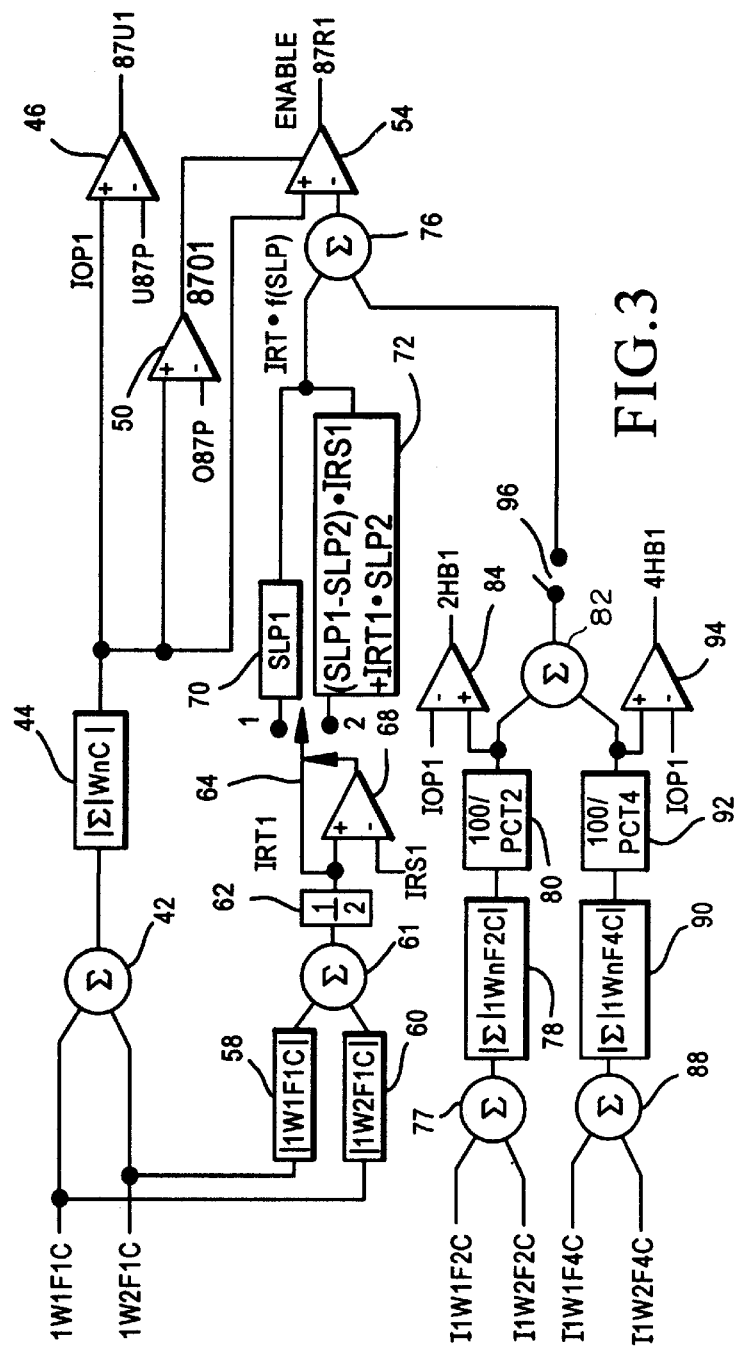
FIG. 3 is a block diagram responsive to the output values of FIG. 1 to produce a restraining signal output using second and forth harmonics of the differential current.

Referring now to FIG. 3, the processed winding current values I1W1F1C and I1W2F1C are applied to an adder 42. These signals are current values (I1) for the first differential element, specifically the compensated (C) fundamental quantity (F1) for windings 1 (W1) and 2 (W2) of the transformer. The output of adder 42 is converted to an absolute value by circuit 44, the output of which is the operating current value, IOP1. $W_n$ is a shorthand representation for $W_1W_2$. This current value is applied to the plus input of a comparator 46. Applied to the minus input is a threshold value, identified as U87P. The value of U87P is selected to provide instantaneous overcurrent protection relative to the value of IOP1, a conventional and well-known protective relay function.

The IOP1 current value is also applied to the plus input of a comparator 50. Applied to the minus input of comparator 50 is a threshold current referred to as 087P. The value of 087P is a selected minimum pickup value necessary for a valid tripping function. Typically, this is a unitless value within a range of 0.1–1.2 multiples of the tap scale value. The output of comparator 50 is applied as an enable input to a comparator 54. Comparator 54 will thus not produce an output unless the IOP1 current is above a selected minimum value. The IOP1 operating current value is also applied to the plus input of comparator 54.

The absolute values of the processed winding current values I1W1F1C and I1W2F1C, respectively, from FIG. 2 are produced by circuits 58 and 60. The outputs of the absolute value circuits are applied to an adder 61. The output of adder 61 is scaled at block 62. While the scaler value in the embodiment shown is one-half, which is preferred, it could also be 1.0. The output of scaler 62 is the restraining current, referred to as IRT1. The restraining current IRT1 is applied to one side of a switch 64 as well as the plus input of a comparator 68. Applied to the minus input of comparator 68 is a threshold value, referred to as IRS1. IRS1 in the embodiment shown is approximately 3 multiples of the tap scale value. The output of comparator 68 controls the position of switch 64. The two switch positions lead to circuits which modify the value of the restraining current by different slope characteristics to produce what is referred to as a restraint quantity. The slope characteristic generally defines the boundary between operation (trip) and restraining functions of the relay. The two possible slope modifications of IRT1 are shown in blocks 70 and 72. It is either a single slope modification (block 70) or a dual slope modification (block 72). The output of blocks 70 and 72 is a restraint current quantity IRT•ƒ(SLP1, SLP2, IRS1) and is applied as an input to an adder 76.

Referring still to FIG. 3, the processed winding current values I1W1F2C and I1W2F2C from FIG. 2, which are the compensated second harmonic current values of the currents from windings 1 and 2 of the transformer, are applied to an adder 77. The absolute value of the output of adder 76 is produced by circuit 78, which is then scaled (circuit 80) by a restraining factor referred to as 100/PCT2. Preferably, this value is approximately 15% but could be within the range of 5–50%. The output of scaler 80 is applied to an adder 82, as well as the plus input of a comparator 84. Similar circuits and circuit connections are provided for the fourth harmonic values of the currents from windings 1 and 2. The circuits include an adder 88, an absolute value circuit 90 and a scaler 92.

The output of scaler 92 is applied to adder 82, as well as the plus input of a comparator 94. The minus inputs to comparator 84 and 94 in each case is the fundamental quantity of the differential current IOP1. The closing of switch 96 results in the circuit of FIG. 3 operating in a restraining manner relative to producing a trip signal using the second and fourth (even) harmonics of the differential current.

The output of adder 96 is applied as another input to adder 76, the output of which is applied to the minus input of comparator 54. The output of comparator 54, referred to as 87R1, is a trip signal, if the blocking portion of the differential element is not asserted, as discussed hereafter. The tripping signal is an indication of an internal fault in the transformer, as opposed to inrush currents.

In summary, when switch 96 is closed, the output of comparator 54 is in effect restrained by the even harmonic values of the differential current, preferably the second and fourth harmonic values, although additional even harmonic values can be used. With the even harmonic values, a greater IOP1 than otherwise is necessary to produce a trip signal. Further, while the embodiment shown preferably uses both the second and fourth harmonics, it is possible to use just the second or some cases even the fourth harmonic alone in particular circumstances.

Still referring to FIG. 3, comparators 84 and 94 produce blocking signals, referred to as 2HB1 and 4HB1, respectively, which are the result of comparisons between the second and fourth harmonic values from windings 1 and 2 relative to the fundamental quantity of the operating current. The outputs of comparators 84 and 94 are used in the blocking circuit portions of the differential element when harmonic blocking is selected.

Figure 4:
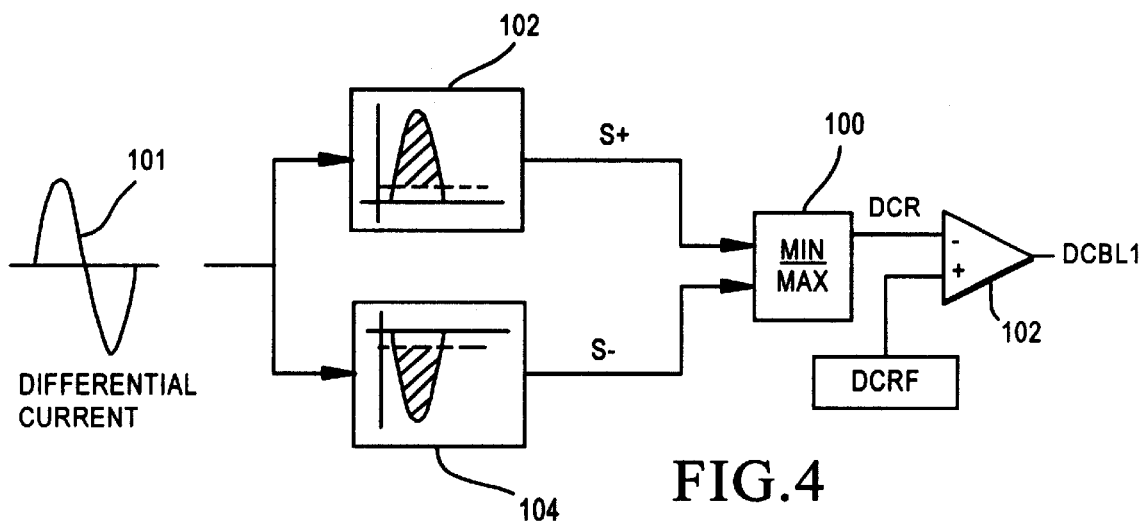
FIG. 4 is a block diagram of a DC blocking logic circuit portion of the present invention.
Figure 5:
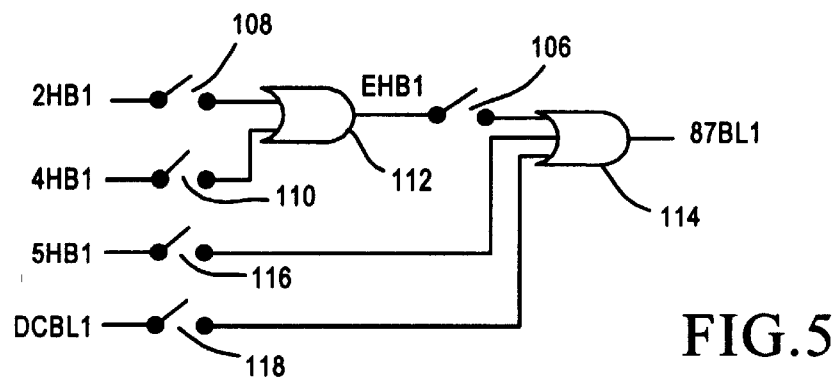
FIG. 5 is a block diagram of the overall blocking logic portion of the system of the present invention.

The blocking signal for the system of the present invention is produced by the circuit of FIG. 5. The inputs to the circuit of FIG. 5 are four blocking signals, including signals 2HB1 and 4HB1, which are produced by the circuit of FIG. 3, as discussed above. The third blocking signal, referred to as 5HB1 is the result of a comparison between the fifth harmonic value of the differential current relative to the fundamental current IOP1, similar to the comparisons which produced the 2HB1 and 4HB1 blocking signals. The blocking signal DCBL1 is produced by the circuit of FIG. 4.

As shown in FIG. 4, the sums of the positive (S+) and negative (S−) current samples over a current cycle are applied as inputs to a min/max circuit 100. A full cycle of differential current is shown at 101, while the positive and negative half-cycles thereof are shown pictorially in blocks 102 and 104. The positive and negative sum values are produced by the DC filter in FIG. 2. The min/max circuit 100 determines the ratio of the minimum and the maximum of the positive and negative sums. If the maximum value is greater than a selected threshold value, the DC ratio (DCR) of the sums is calculated. This is accomplished by dividing the S+ and S− minimum sum values by the S+ and S− maximum sum values.

The DCR signal is applied to the minus input of a comparator 102, while a threshold value, referred to as DCRF, is applied to the plus input of comparator 102. When the DCR value is less than the threshold value DCRF, the output of comparator 102 is a blocking signal referred to as DCBL1. Hence, the relay system blocking condition for DC blocking is in accordance with the following equation: DCR<DCRF.

By defining DCR as the ratio of the minimum S+ and S− sum values to the maximum S+ and S− sum values, differential currents having similar positive or negative sums are accounted for. The DCRF value is typically 0.1, although it could be varied, such as within a range of 0.05–0.5. The DC blocking function helps to distinguish inrush currents from fault currents, since unipolar inrush currents typically have significantly larger positive or negative sums only.

Referring again to FIG. 5, the blocking portion of the differential element arrangement of the present invention produces a blocking signal output if any one of the individual blocking functions is present. If the even harmonic portion of FIG. 3 is not in use for a restraining function, i.e. if switch 96 is in an open position, then switch 106 in FIG. 5 closes automatically to produce the function of even harmonic blocking. In such an arrangement disclosed herein, the differential element arrangement operates in a blocking-only mode, without any even harmonic restraint function.

The second harmonic and fourth harmonic blocking signals 2HB1 and 4HB1 from FIG. 3, respectively, are applied to one side of switches 108 and 110. When switch 106 is in a closed position, either or both of the second and fourth harmonics can be used for blocking. This is accomplished by connecting switches 108 and 110 as inputs to an OR gate 112, the output of which is applied to one side of switch 106. Switch 106 is connected to OR gate 114, the output of which, if present, is the system blocking signal 87BL1. Switches 116 and 118 control the application of the fifth harmonic blocking signal, 5HB1, and the DC blocking signal, DCBL1 (the output of FIG. 4), to OR gate 114. Hence, the blocking function of the differential element arrangement can be supplied by second, fourth and fifth harmonic signals which are the result of comparisons of those signals (scaled) with the operating current IOP1, as well as by the DC blocking signal DCBL1. If any of these individual blocking signals is present, the output of OR gate 114 is the blocking signal 87BL1.

Figure 6:
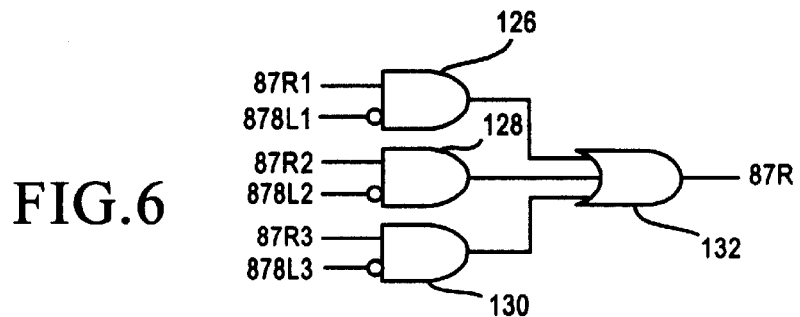
FIG. 6 is a logic diagram which results in a tripping output signal from the system of the present invention.

FIG. 6 shows a circuit for combining the restraining function with the blocking function. The output of the circuit of FIG. 6 produces the actual system tripping signal 87R, which is applied to a circuit breaker. The signal 87R indicates the presence of an internal fault. FIG. 6 shows an "independent blocking" mode arrangement. In this arrangement, the restraining signals from the three differential elements in the system are supervised (overridden) by the blocking signals from the three differential elements. The restraining signal for each element is applied as one input to an associated AND gate while the other input is a NOT input for the blocking function for that particular element. Hence, for AND gate 126, the restraining signal 87R1 for the first differential element is applied to one input while the 87 BL1 signal is applied to a NOT input thereof. AND gates 128 and 130 perform similar, independent functions for the other two differential elements in the system. The outputs of AND gates 126, 128 and 130 are applied to an OR gate 132, the output of which produces tripping signal 87R if there is a true or high output from any of the individual AND gates.

The presence of the 87R tripping signal is an indication that there is an internal fault as opposed to an inrush or an over-excitation condition; the 87R signal results in the transformer being taken out of service.

Figure 7:
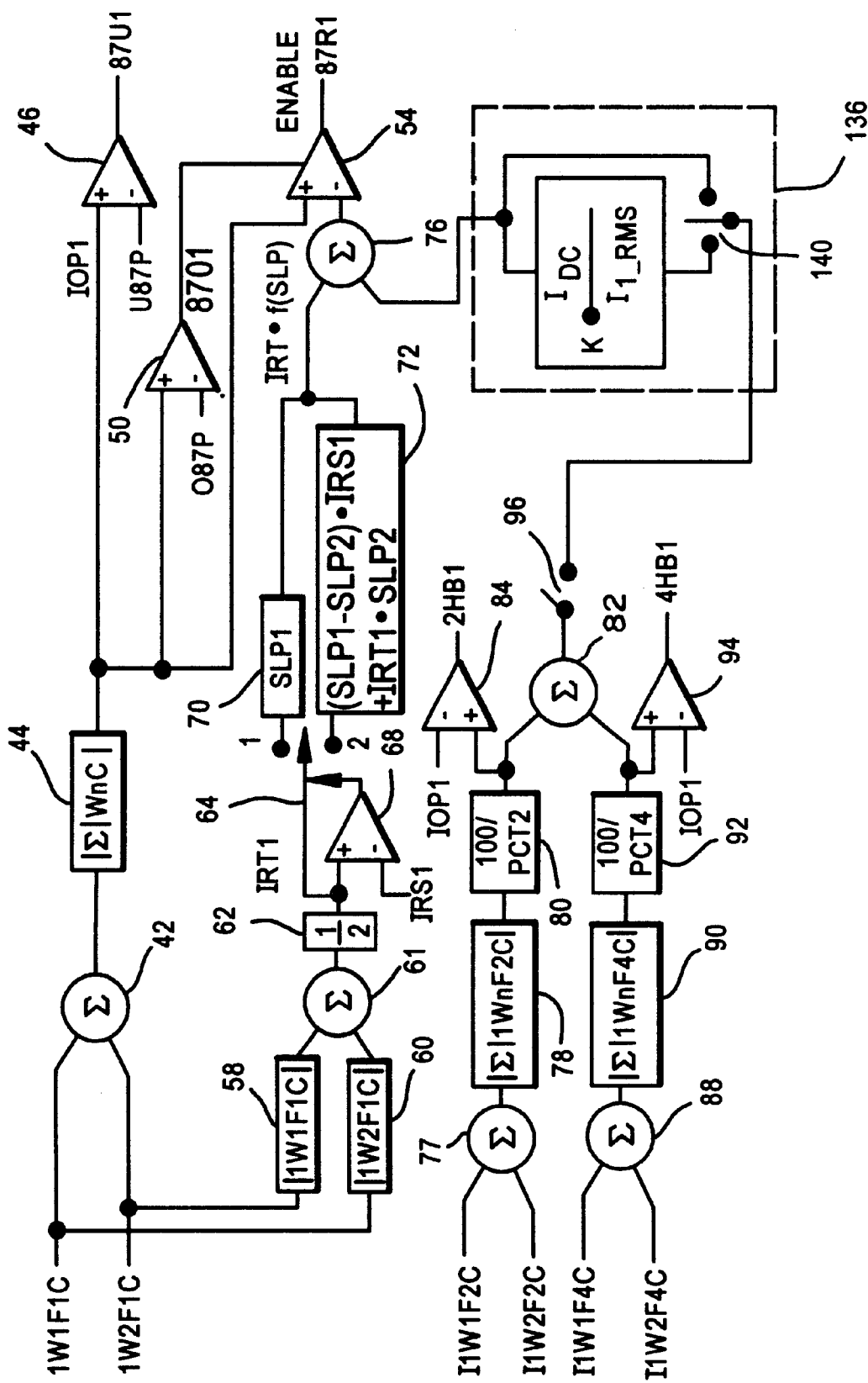
FIG. 7 is a block diagram similar to that of FIG. 3, with an added feature.

FIG. 7 shows an alternative circuit similar to FIG. 3, with an addition of one circuit 136. In FIG. 7, if the second and fourth harmonics are to be used in the restraining circuit, then switch 96 is closed, as is the case with FIG. 3; otherwise, it is open. Switch 140 is moved to position No. 1 if the DC current is larger than the RMS (root mean square) value of the fundamental quantity. Otherwise, switch 140 is moved to position No. 2 and the overall circuit is identical in operation to that of FIG. 3. In switch position No. 1, the restraining quantity is multiplied by the value:

$$k \cdot \frac{I_{DC}}{I_{RMS}}$$

Typically, k is a scale factor within the range of 0.5–3.0, preferably 1.5. IDC and IRMS are values from the differential current. When the DC component of the fundamental quantity is greater than the RMS value of the fundamental quantity, the restraining output of the second and fourth harmonics is increased, i.e. given a boost.

The above-described invention produces accurate results (distinguishing between a true internal transformer fault and selected other operating conditions, notably inrush and over-excitation, in a number of operating situations where previous arrangements have resulted in a misoperation. The use of the even harmonic currents to help in restraining the differential relay prevents misoperation in a number of cases. Adding fifth harmonic blocking and/or DC ratio blocking as supervision of the second and fourth harmonic restraining functions provides additional security. Further, the combination of even harmonic restraint with the DC ratio blocking provides a good compromise of speed and reliability.

In summary, even harmonic restraining function improves security for inrush currents with low second harmonic content and further maintains dependability for internal faults where there is current transformer (CT) saturation. The use of the fifth harmonic blocking function in addition guarantees an appropriate relay response relative to over-excitation of the transformer, while the DC offset blocking function provides security for inrush conditions having very low total harmonic distortion.

Hence, the present invention improves security and maintains dependability for particular transformer operating conditions, distinguishing appropriately between operating conditions which are not faults, and true internal transformer faults for which the transformer must be removed from service.

Although a preferred embodiment of the invention has been disclosed here for purposes of illustration, it should be understood that various changes, modifications and substitutions may be incorporated without departing from the spirit of the invention, which is defined by the claims which follow.

What is claimed is:

1. A system for power transformer differential current protection, comprising:
   means for developing a differential current value from processed winding current values which are representative of current transformer (CT) secondary current values obtained from the windings of a power transformer;
   means for developing an operating current value from said differential current value;
   means for developing a restraining current value from said processed winding current values;
   means for obtaining at least one even harmonic value of said differential current value; and
   means for comparing the sum of the restraining current value and said at least one even harmonic value with the operating current value and for producing an output signal which in turn is useful in producing a trip signal when the operating current value is larger than said sum.

2. The system of claim 1, including means for enabling the comparing means when the operating current value is above a selected threshold scale value.

3. The system of claim 2, wherein the selected threshold value is within the range of 0.1–1.2.

4. The system of claim 1, wherein the restraining current value is the sum of the absolute values of two differential current values, multiplied by a selected scale factor, and further multiplied by a selected slope characteristic, wherein the scale factor is one of 0.5 or 1.0 and wherein the selected slope characteristic is a selected one of a single slope characteristic and a dual slope characteristic.

5. A system of claim 4, wherein the slope characteristic is determined by the value of the restraining current value relative to a selected threshold value.

6. A system of claim 1, wherein said at least one even harmonic value includes the second harmonic value.

7. A system of claim 1, wherein said means for obtaining includes means for obtaining more than one even harmonic value of said differential current value, including the second and fourth harmonic values.

8. A system of claim 7, wherein the second and fourth harmonic values are absolute values, multiplied by first and second selected scale values, respectively.

9. A system of claim 8, wherein the first scale value is within the range of 5–50% and the second scale value is within the range of 5–50%.

10. A system of claim 1, wherein the operating current value is the absolute value of the sum of the differential currents for all of the transformer windings.

11. A system of claim 1, including means for blocking said output signal from operating as a tripping signal if the fifth harmonic of the differential current is larger than the operating current value.

12. A system of claim 1, including means for blocking said output signal from operating as a trip signal if the ratio of the minimums of the positive and negative one-cycle sample sums of the differential current to the maximums of said positive and negative one-cycle sample sums is below a threshold value of 0.1.

13. A system of claim 12, including means for blocking said output signal from operating as a trip signal if a scaled fifth harmonic of the differential current is greater than the operating current value.

14. A system of claim 8, wherein said second and fourth harmonic values are used to block trip signals in the event that said harmonic values are not used to produce said output signal and said harmonic values are larger than the operating current value.

15. A system of claim 13, wherein said system operates on all three phases of the power system signal, wherein the system produces an output signal and a blocking signal for each phase or combination of phases.

16. A system of claim 15, wherein the output signals and the blocking signals for each phase are processed independently relative to producing a tripping signal.

* * * * *